Sept. 20, 1927.
F. M. CLARK
TROLLEY WHEEL
Filed Dec. 20, 1922
1,642,765
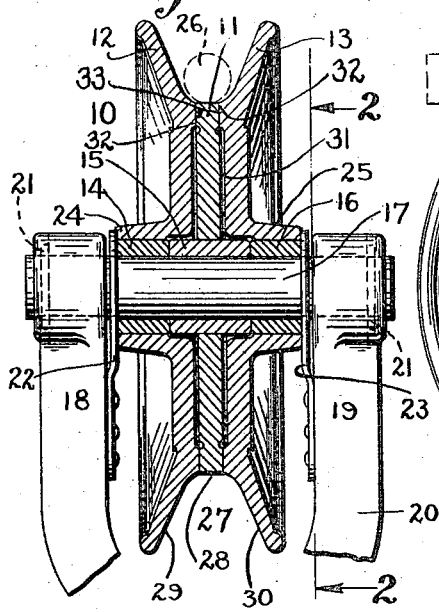
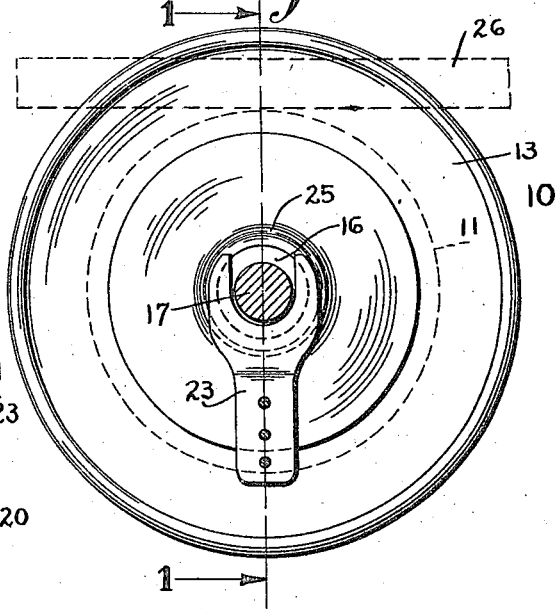
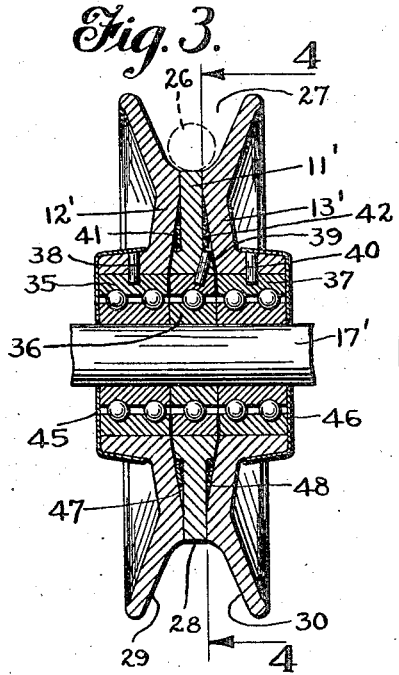
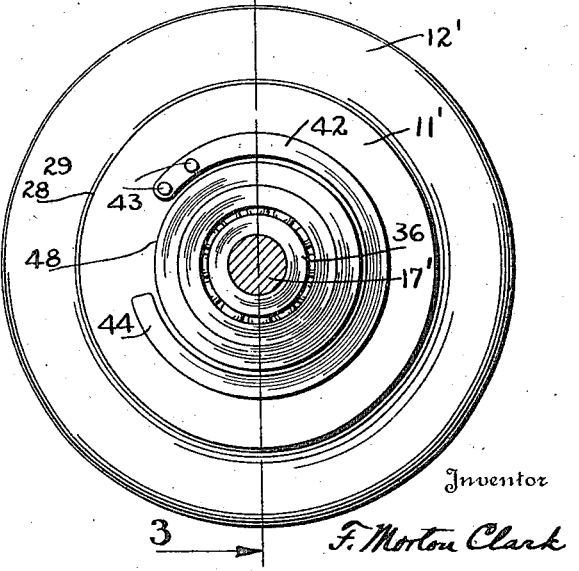
Inventor
F. Morton Clark
By Henry E. Rockwell
Attorney Patented Sept. 20, 1927.

1,642,765

UNITED STATES PATENT OFFICE.

FRANCIS MORTON CLARK, OF BRIDGEPORT, CONNECTICUT, ASSIGNOR TO BRIDGEPORT BRASS COMPANY, OF BRIDGEPORT, CONNECTICUT.

TROLLEY WHEEL.

Application filed December 20, 1922. Serial No. 608,003.

My invention relates to trolley wheels such as are commonly used on electrically driven vehicles or cars employed on street railways, electrified steam railroads or wherever power is to be collected for a moving vehicle from a stationary circuit conductor by a rotatable contact member.

Heretofore trolley wheels have generally been made of a one piece casting having a groove upon its periphery slightly larger in radius than the trolley wire upon which it rolls. After having been used a short time the bottom of the trolley wheel groove becomes worn allowing the wire to contact with the same at more than one point. This naturally results in a rubbing action at the points in contact lying in the paths of the greater radii which causes wear upon the sides of the wire as well as in the groove of the trolley wheel. As this action continues, the groove becomes deformed and the wire uneven which results in arcing and trouble in keeping the trolley wheel upon the wire. The arcing thus caused further deteriorates the wire and wheel by causing pitting of the surfaces of the respective parts whereby increased arcing and overheating occurs which causes brittleness and therefore largely contributes to the breaking of the wires under strains. This rubbing action is especially noticeable at sharp curves where the wire runs through the groove diagonally, contacting upon both side surfaces of the groove.

The principal object, therefore, of this invention is to eliminate the rubbing action between the trolley wheel or like collector and the conductor upon which it rolls.

Another object of this invention is to produce a trolley wheel which will have only a one point contact with the wire or other stationary conductor of like form.

Another object of this inventon is to produce a trolley wheel of separate sections, each section of which will be independently rotatable, easily replaced, and some of which are interchangeable.

Another object of this invention is to produce a trolley wheel made up of separate sections having individual bearing members and being independently rotatable upon a common shaft.

A still further object of this invention is to produce a trolley wheel having all of the above merits incorporated therein, but in addition thereto, being equipped with roller bearings and having the independently rotatable sections electrically connected to prevent the roller bearing from being a part of the circuit of the electrical current.

To these and other ends the invention consists in the novel features and combinations of parts to be hereinafter described and claimed.

In the accompanying drawings:

Fig. 1 is a vertical section, on line 1—1, Fig. 2, of a trolley wheel embodying my improvements, the harp and spring contacts being shown in elevation for the sake of clearness;

Fig. 2 is a section, on line 2—2 Fig. 1, through the shaft showing a side view of the trolley wheel;

Fig. 3 is a vertical section, on line 3—3 Fig. 4, of a slightly modified form of trolley wheel; and Fig. 4 is a section, substantially on line 4—4 Fig. 3, showing a side view of the inner section of the wheel and the contact member between sections.

The preferred form of trolley wheel embodying my invention, selected to illustrate and describe the same, comprises a wheel 10 made of three independently rotatable sections but in some cases and under certain circumstances it may be advisable to make such a wheel of a different number of sections.

The wheel 10 comprises a central member 11 and outer members 12 and 13, which are usually made of a copper alloy. These members are securely mounted upon bushings 14, 15, and 16 which serve as bearing members for the respective wheel portions when the same are juxtaposed and mounted upon the shaft 17. The shaft 17 is mounted between the arms 18 and 19 of the trolley harp 20 and held against rotation by the pins 21, usually set in grooves in the outside surface of the arms. Spring contacts 22 and 23 bear against the side surfaces or hubs 24 and 25 of the outer members 12 and 13 and conduct the power collected from a wire 26, from the wheel to the harp, as well as acting as a clamping means to hold the members 12 and 13 in contact with the inner or adjacent member 11. The outer members are made interchangeable which facilitates assembly and replacement.

In order that the bearing members 14, 15 and 16 and the shaft 17 will not be compelled to be a part of the electrical circuit from the wire 26 to the spring arms 22 and 23, the wheel portions 11, 12 and 13 are allowed to be in contact over a portion of their opposing end faces. The structure whereby this result is obtained is shown in Fig. 1 wherein the outer members 12 and 13 are recessed as at 31 at their inner end faces from a point adjacent the bearing members 14 and 16, respectively, to a point adjacent the peripheral rim of said outer members. This construction leaves an annular boss 32 upon the inner face of each part. The inner member is provided with an annular boss 33 upon each end face thereof. The opposing bosses 32 and 33 being in contact when the parts of the wheel are in juxtaposed position collect the current and complete the circuit from the wire 26 to the spring arms 22 and 23 through the hubs 24 and 25 of the outer members, respectively. As the wheel members are in contact at the periphery, dirt and other foreign matter is prevented from entering in between the parts and on to the bearings and shaft.

When assembled together, the wheel portions 11, 12, and 13 form a groove 27 through which the wire passes. This groove is generally U shaped but differs somewhat from a true U shape by having a flat base 28, and divergent sides 29 and 30, produced by providing a flat surface on the periphery of the inner member 11 and angular surfaces on the outer members 12 and 13. This construction insures a one point contact between any point on the surface of the groove 27 and the wire 26 or other conductor of similar form.

When wearing occurs on the surface within the groove, or when the wheel is used upon an uneven wire already in service, a contact may be formed between two points within the groove 27. That is, the wire may contact with the inner member at one point and with an outer member at another point, in which case the two members, being independently rotatable, will each rotate at the speed governed by the radius of the same at the point of contact with the wire, whereby rubbing at the contact point corresponding to the larger radius is eliminated, and undue wear upon both the wire and the wheel is forestalled.

In Figures 3 and 4, the trolley wheel is illustrated as being equipped with roller bearings 35, 36, and 37. The inner races of these bearings are assembled upon the shaft 17' so as to be non-rotatable thereon. The outer races are secured to the wheel members 11', 12', and 13' respectively. Pins 38, 39, and 40 are shown as the means for securing the outer races to the wheel members, but other means may be used to advantage.

In order that the ball-bearings will not be compelled to be a part of the electrical circuit and to carry any part of the current, spring contacts 41 and 42 are provided. These contacts are mounted in the recesses 47 and 48 between the respective members and contact with the adjacent members to electrically connect the same. One of these, 42, is shown in Fig. 4 secured to the inner member 11' by rivets 43. The free ends 44 of these contacts are sprung outward to cause a wiping contact with the adjacent outer members. The hubs of the outer members 12' and 13' together with the outer faces of their respective ball-bearings are enclosed in caps or sheaths 45 and 46 which conduct the power collected by the wheel to the harp spring contacts 22 and 23.

While I have shown and described preferred embodiments of my invention, the same is not limited thereto but may be varied in details without departing from the spirit of the invention or the scope of the appended claims.

What I claim is:

1. The combination of a trolley harp, a nonrotatable shaft mounted in the arms thereof, a trolley wheel comprising a plurality of juxtaposed members, said members mounted to rotate independently upon said shaft, means secured to the outer surface of the inner member contacting with said outer members to electrically connect said members together and means mounted upon said harp contacting with the outer pair of said members to electrically connect said members with said harp.

2. A wheel comprising a pair of outer members and an inner member, said members forming a groove at the periphery of said wheel when juxtaposed, said outer members being interchangeable and independently rotatable relatively to said inner member, and means provided upon said inner member rotatable therewith whereby said outer members are electrically connected thereto.

3. A trolley wheel comprising a plurality of juxtaposed independently rotatable members, and means between adjacent members secured to and rotatable with one of the members and in contact with the other for electrically connecting the same.

4. The combination of, a trolley wheel shaft, a plurality of juxtaposed members forming a trolley wheel having a groove at its periphery, means mounted between the adjacent members to electrically connect the same and a plurality of ball-bearings for the members, secured to the individual members, and to the shaft, respectively, whereby the members are independently rotatable about the shaft.

5. A rolling contact member for collecting power from a stationary current-carrying member and for transmitting the same to a terminal of a moving vehicle, comprising a plurality of ball bearings, juxtaposed members, mounted upon the outer races of said bearings, respectively, said outer races being independently rotatable, means between adjacent members to electrically connect said members together, and means upon the outer pair of members contacting with the terminal, whereby the ball-bearings are excluded from the circuit.

6. In a device for the purpose described, a wheel comprising a plurality of juxtaposed disc-formed members rotatably mounted upon a shaft, means between adjacent members secured to one for rotation therewith, said means adapted to electrically connect said members together, a support for such shaft, and means secured to said support in contact with the outer pair of said members whereby the support is in electrical connection with all of said members.

7. In a device for the purpose described, a wheel comprising a plurality of juxtaposed disc-formed members rotatably mounted upon a shaft, a support for the shaft, means between adjacent members in contact therewith, and means between said outer members and said support in contact with both whereby electrical energy may be transmitted from either of said members to said support without said shaft being in the circuit.

8. In combination, a trolley wheel harp, a trolley wheel rotatably mounted upon a shaft, said shaft being secured between the arms of said harp, said wheel comprising a plurality of juxtaposed independently rotatable members, and means for electrically connecting all of the members together and to the harp whereby the shaft is excluded from the circuit.

9. A trolley wheel having a substantially U shaped groove on the periphery thereof, comprising a plurality of juxtaposed members electrically connected one to the other through brushes fastened onto one of them, said members being mounted upon the outer races of roller bearings or the like.

10. The combination of a trolley harp having spring contacts thereon, a stationary shaft supported by said harp, and a trolley wheel comprising a plurality of juxtaposed members electrically connected through brushes fastened on opposite sides of one of them and in contact with the others, said members being mounted upon separate bushings, said bushings being independently rotatable upon said shaft between and in contact with said springs.

11. In combination, a trolley harp, a stationary shaft supported by said harp, a trolley wheel comprising a plurality of juxtaposed members each having a hub portion rotatably mounted on said shaft and portions extending radially from said hubs, each of said members being independently rotatable upon said shaft, means for electrically connecting said members together, said means being positioned radially relative to said hub portions, and means for conducting power from said wheel to said harp independently of said shaft and hub portions.

In witness whereof, I hereunto set my hand on the 14 day of December, 1922.

F. MORTON CLARK.